(12) United States Patent
Spooner et al.

(10) Patent No.: US 11,084,341 B2
(45) Date of Patent: Aug. 10, 2021

(54) HITCH ASSEMBLY

(71) Applicant: Rees Operations Pty Ltd, Camden Park (AU)

(72) Inventors: Greg Spooner, Camden Park (AU); Huey Lam, Camden Park (AU); Matthew Reimers, Camden Park (AU)

(73) Assignee: Rees Operations Pty Ltd., Camden Park (AU)

( * ) Notice: Subject to any disclaimer, the term of this patent is extended or adjusted under 35 U.S.C. 154(b) by 259 days.

(21) Appl. No.: 16/277,358

(22) Filed: Feb. 15, 2019

(65) Prior Publication Data

US 2019/0255897 A1   Aug. 22, 2019

(51) Int. Cl.
| | | |
|---|---|---|
| *B60D 1/24* | (2006.01) | |
| *B60D 1/60* | (2006.01) | |
| *B60D 1/52* | (2006.01) | |

(52) U.S. Cl.
CPC ............... *B60D 1/241* (2013.01); *B60D 1/52* (2013.01); *B60D 1/605* (2013.01)

(58) Field of Classification Search
CPC ....................................................... B60D 1/241
See application file for complete search history.

(56) References Cited

U.S. PATENT DOCUMENTS

| | | | | |
|---|---|---|---|---|
| 8,419,041 B2* | 4/2013 | Bessette | ................... | B60D 1/52 |
| | | | | 280/507 |
| 9,073,396 B2* | 7/2015 | Laurer | ..................... | B60D 1/52 |
| 9,586,450 B2* | 3/2017 | Ford | ........................ | B60D 1/30 |
| 9,981,513 B2* | 5/2018 | Belinky | ................. | B60D 1/605 |

* cited by examiner

*Primary Examiner* — Kevin Hurley
(74) *Attorney, Agent, or Firm* — Christopher M. Scherer; DeWitt LLP

(57) ABSTRACT

A hitch assembly comprising a receiver having an opening for receiving a hitch member, an anti-rattle member secured with respect to the receiver, and a hitch member comprising a hitch body configured to be received by the receiver, and an engagement portion, wherein when the hitch body is received by the receiver, the engagement portion bears against the anti-rattle member causing at least a portion of the anti-rattle member to resiliently deform in a manner that a reaction force from the resilient deformation causes the hitch body to bear against the receiver.

13 Claims, 11 Drawing Sheets

HITCH ASSEMBLY

CROSS-REFERENCE TO RELATED APPLICATIONS

The present application claims priority to Australian Patent Application No. 2018900493, filed Feb. 16, 2018, the contents of which are incorporated herein by reference in its entirety.

TECHNICAL FIELD

The present invention relates to a hitch assembly.

BACKGROUND

Many vehicles are equipped with tow bars for the purpose of towing trailers or caravans via a towing hitch. The tow bar may also be used as an attachment point for other cargo accessories such as bike racks or cargo boxes. Tow bars typically include a hitch receiver or hitch tube with an opening configured to receive a towing hitch or other cargo accessory. The size of this opening varies depending on the specific application, but is typically of square cross section.

A typical towing hitch or cargo accessory is a removable component that has a tube section that slides into the opening of the receiver and fastens with a pin and clip or other suitable fastening arrangement. The tube section has outer dimensions slightly smaller than the internal dimensions of the receiver opening to allow the tube section to slide within the receiver opening. While there must be sufficient clearance to allow the tube section to slide within the receiver, this clearance allows relative movement between the two components, leading to the tube section rattling or vibrating within the receiver opening. This rattling or vibration can be a distraction to the driver and can cause unnecessary wear to the components.

It is against the above background, and the problems and difficulties presented therein, that the present invention has been developed.

SUMMARY

According to a first aspect, there is provided a hitch assembly comprising a receiver having an opening for receiving a hitch member, an anti-rattle member secured with respect to the receiver, and a hitch member comprising a hitch body configured to be received by the receiver, and an engagement portion, wherein when the hitch body is received by the receiver, the engagement portion bears against the anti-rattle member causing at least a portion of the anti-rattle member to resiliently deform in a manner that a reaction force from the resilient deformation causes the hitch body to bear against the receiver, wherein the anti-rattle member is pivotally secured to the receiver and is moveable between a closed position, where the anti-rattle member does not obstruct the opening of the receiver.

In one form, the engagement portion is in the form of a ramped surface disposed at an angle with respect to the hitch body.

In one form, the anti-rattle member further comprises a hitch following portion configured to follow the ramped surface as the hitch is inserted into the receiver.

In one form, the engagement portion has a first ramped surface disposed at a first angle with respect to the hitch body, and a second ramped surface disposed at a second angle with respect to the hitch body, where the first and second ramped surfaces intersect at a tip.

In one form, the anti-rattle member further comprises a hitch following projection configured to follow the first and second ramped surfaces of the engagement portion as the hitch is inserted into the receiver.

In one form, the engagement portion is positioned with respect to the hitch body such that the hitch following projection just passes the tip as the hitch tube reaches a received position in the receiver.

In one form, movement of the hitch following projection past the tip provides physical feedback that the hitch member is in the received position.

In one form, the anti-rattle member comprises a rigid body and a resilient portion.

In one form, the resilient portion is an insert located within a recess in the rigid body.

In one form, the resilient portion and the rigid portion are co-molded to form a unitary component.

In one form, the resilient portion is made from a resilient material.

In one form, when the anti-rattle member is in the open position, at least a portion of the anti-rattle member bears against an outer surface of the receiver, such that any further rotation of the anti-rattle member beyond the open position will cause the resilient portion of the anti-rattle member to resiliently deform as it is forced against the outer surface.

In one form, the anti-rattle member is able to be latched in the closed position.

BRIEF DESCRIPTION OF DRAWINGS

Embodiments of the present invention will be discussed with reference to the accompanying drawings wherein.

DESCRIPTION OF EMBODIMENTS

Figure 1:
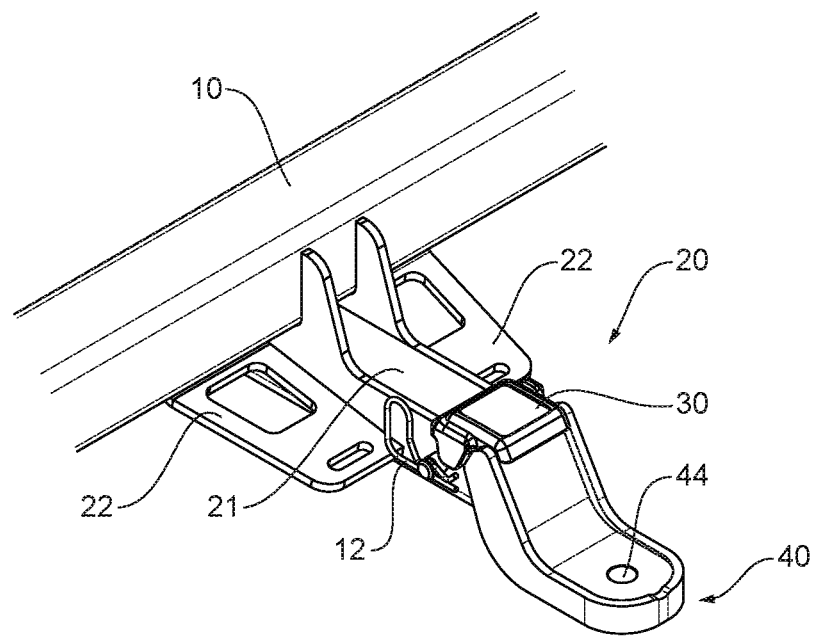
FIG. 1 is a perspective view of a hitch assembly according to an embodiment.

Referring to FIGS. 1 to 17B, there is shown a hitch assembly comprising a receiver 20 having an opening 23 for receiving a hitch member 40, an anti-rattle member 30 secured with respect to the receiver 20, and a hitch member 40. As shown in FIGS. 2 and 15, the hitch member 40 comprises a hitch body 41 configured to be received by the receiver 20. The hitch member 40 includes an engagement portion 46 which can be seen in FIG. 12. When the hitch body 41 is received by the receiver 20, the engagement portion 46 (best shown in FIGS. 12-15) bears against the anti-rattle member 30 causing the anti-rattle member 30 to resiliently deform in a manner that a reaction force from the resilient deformation causes the hitch body 41 to bear against the receiver 20.

Figure 2:
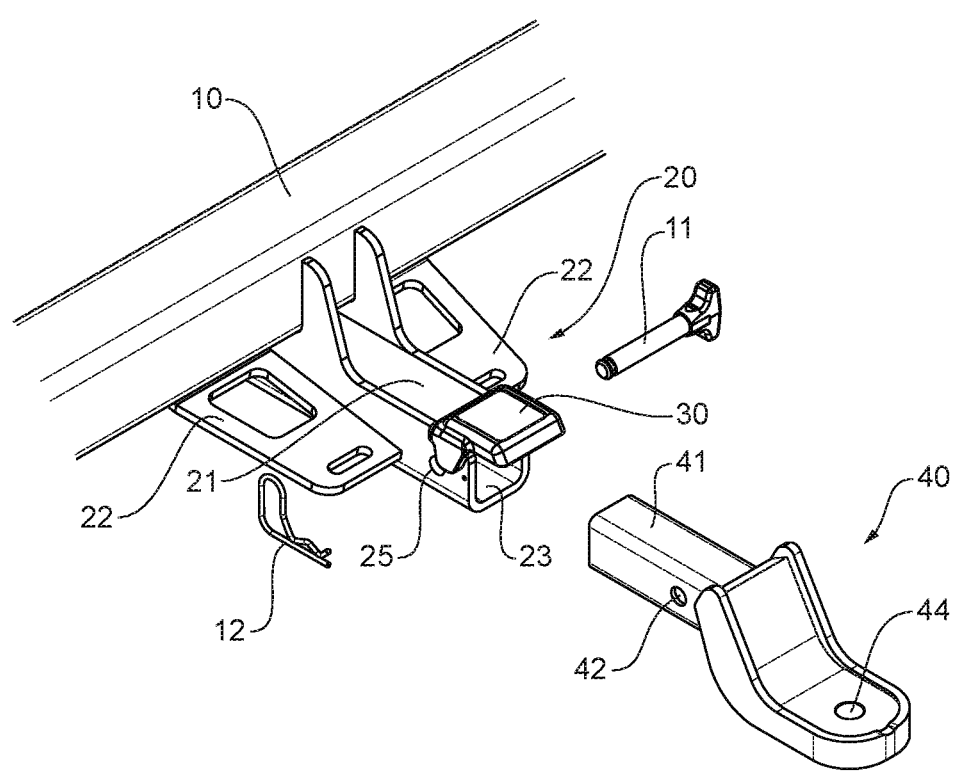
FIG. 2 is a partially exploded view of the hitch assembly of FIG. 1, detailing a hitch member attachment means.

Referring now to FIGS. 1 and 2, there is shown a hitch assembly comprising a main bar 10 configured to be rigidly secured to a vehicle and a receiver 20 in connection with the main bar 10. The receiver 20 comprises a receiver tube 21 having a square cross section, and an opening 23 at one end for receiving a hitch member 40. The connection between the main bar 10 and the receiver 20 is reinforced by gussets 22.

The assembly further comprises a hitch member 40 comprising a hitch body in the form of a square hitch tube 41 configured to be received by the receiver tube 21. When the hitch tube 41 is received by the receiver tube 21, it may be retained by a hitch pin 11 inserted through hitch pin apertures 25, 42 in the receiver tube and hitch tube 21, 41 respectively. The hitch pin 11 may be secured in place by a hitch pin clip 12 or other suitable securing means. While in the embodiment shown, the hitch member 40 is retained by the hitch pin, it will be appreciated that it may be retained by any other suitable retaining means, including a bolt and nut combination.

While in the embodiment shown, the receiver 20 and hitch body 41 are in the form of tubes having square cross-sections, it will be appreciated that they may take any other form such that the receiver 20 is suitable for receiving the hitch body, and the hitch body is suitable for being received by the receiver.

Figure 7:
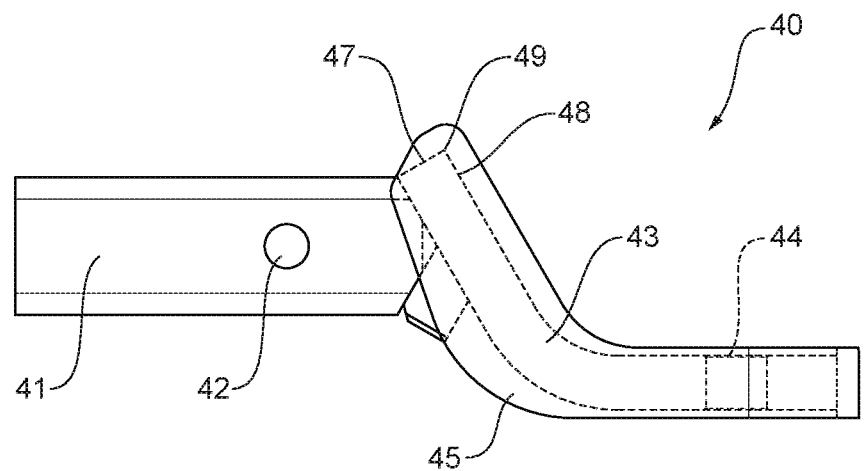
FIG. 7 is a side view of a hitch member according to an embodiment.
Figure 8:
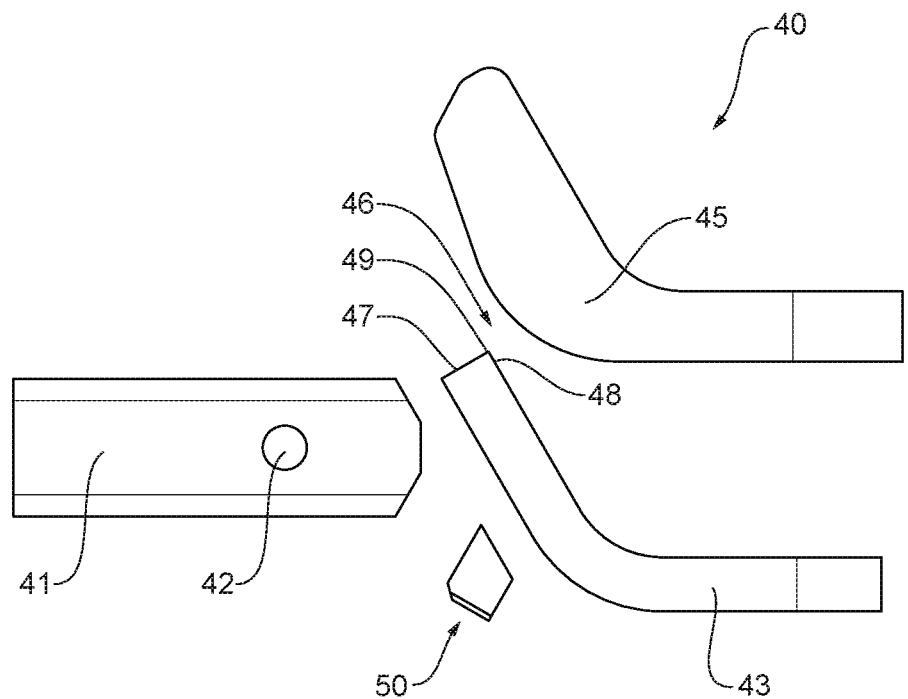
FIG. 8 is an exploded view of the hitch member of FIG. 7.

As shown in FIGS. 7 and 8, the hitch member 40 further comprises a tongue portion 43 in connection with the hitch tube 41, having a tow ball aperture 44 for accepting a tow ball shank (not shown). The hitch member 40 also comprises a skirt 45 around the edge of the tongue portion 43 to strengthen the tongue portion 43.

The hitch member 40 may be a welded component, where the hitch tube 41, tongue portion 43 and skirt 45 are welded together, alternatively, the hitch member 40 may be a cast or forged component.

Figure 3:
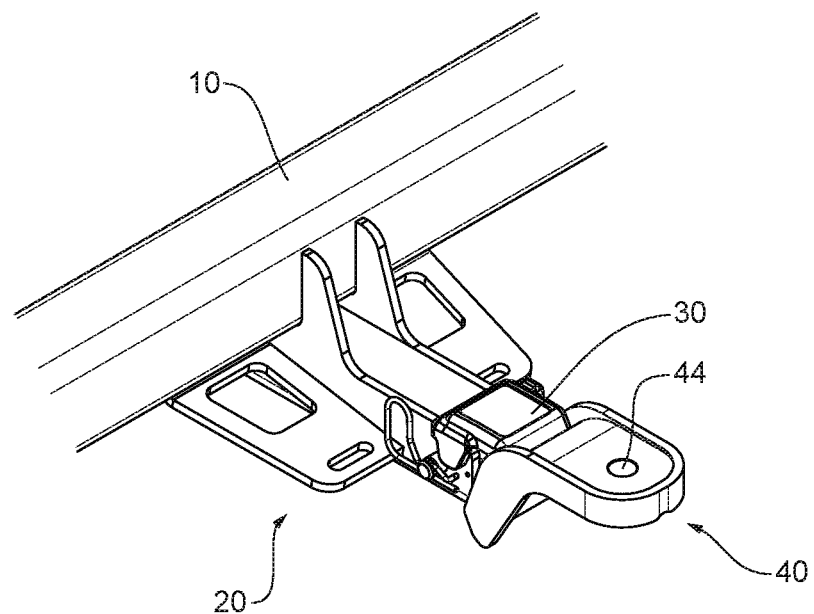
FIG. 3 is a perspective view of the hitch assembly of FIG. 1, with the hitch member inverted.

As shown in FIG. 3, the hitch member 40 is also capable of being received by the receiver 20 in an inverted configuration, such that a single hitch member 40 is capable of offering two distinct tow ball mounting heights.

Figure 4:
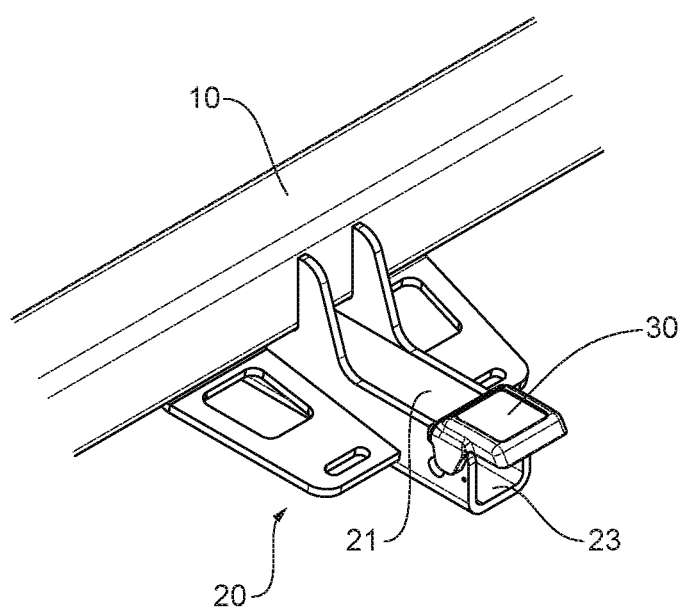
FIG. 4 is a perspective view of the hitch assembly of FIG. 1, with the hitch member removed and an anti-rattle member in the open position.
Figure 5:
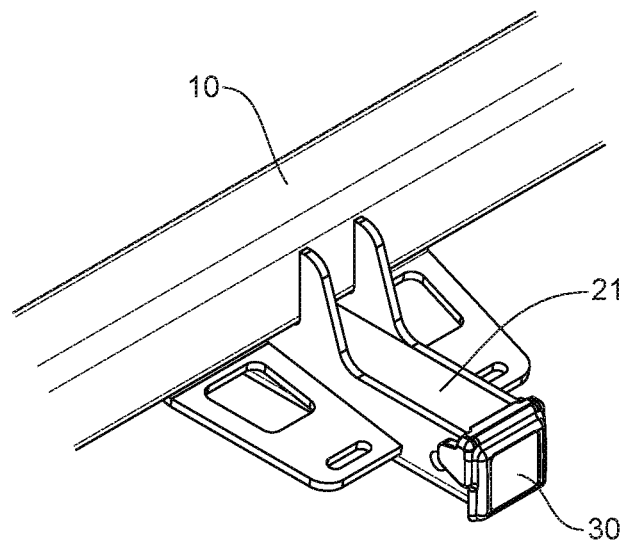
FIG. 5 is a perspective view of the hitch assembly of FIG. 1, with the hitch member removed and the anti-rattle member in the closed position.
Figure 6:
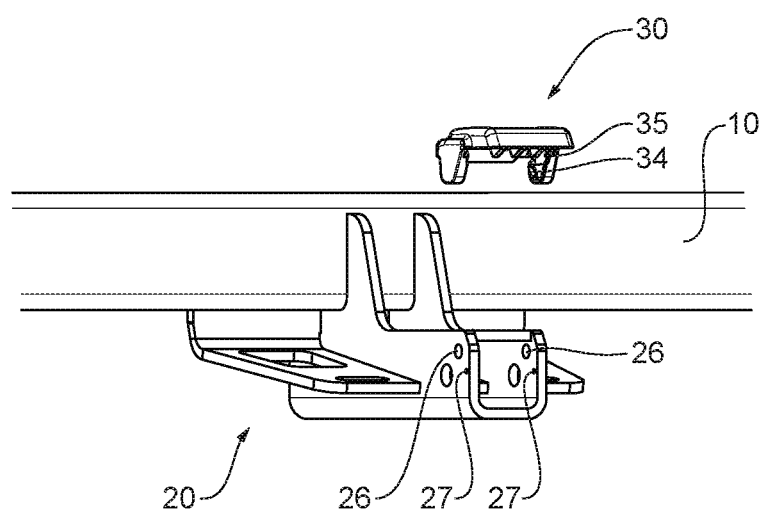
FIG. 6 is an exploded view of the hitch assembly of FIG. 4, detailing the relationship between the receiver and the anti-rattle member.
Figure 11:
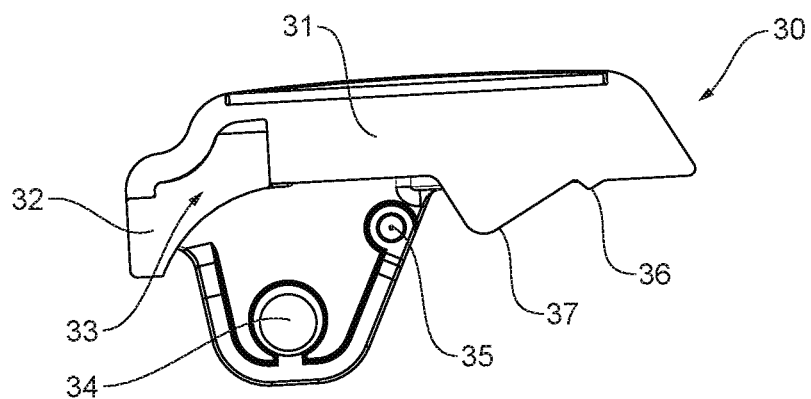
FIG. 11 is a cross sectional view of the anti-rattle member of FIG. 9.
Figure 16A:
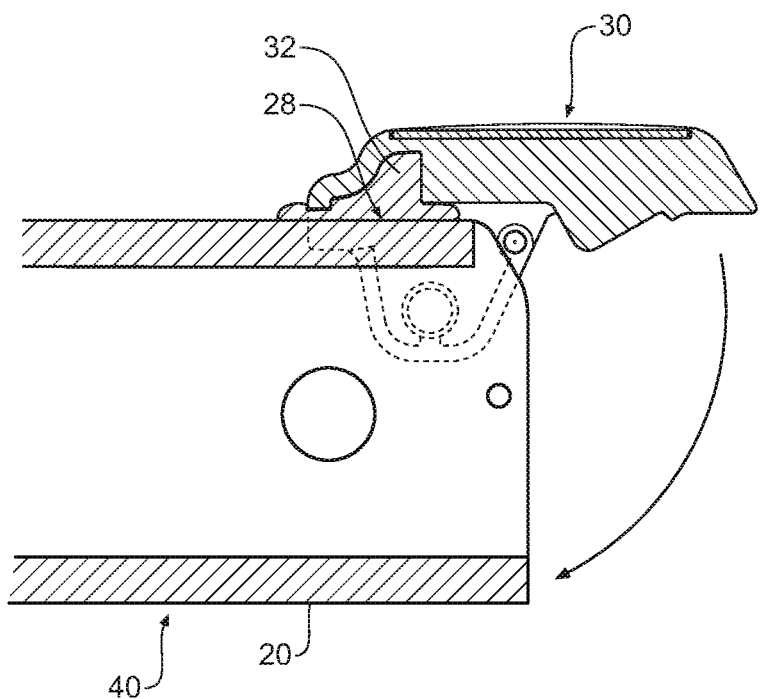
FIG. 16A is a cross sectional view of the receiver and anti-rattle member of FIG. 4, where the anti-rattle member is in an open position.
Figure 16B:
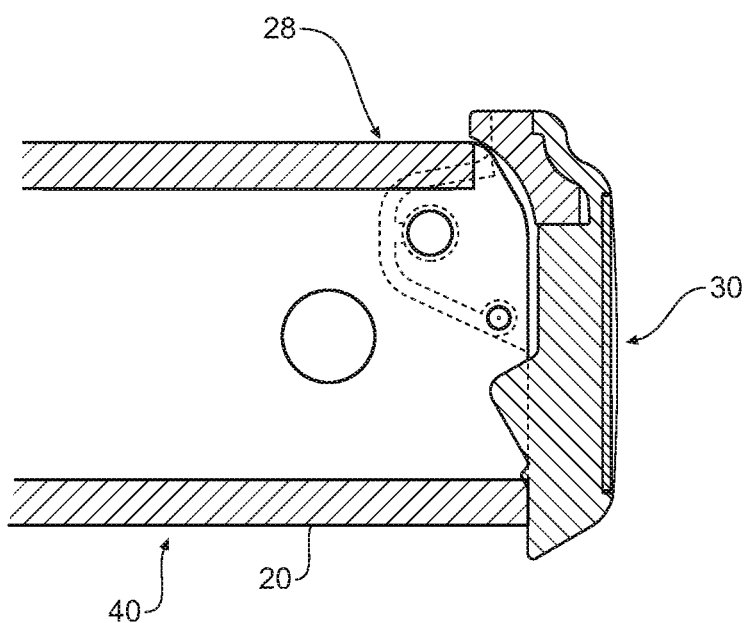
FIG. 16B is a cross sectional view of the receiver and anti-rattle member of FIG. 5, where the anti-rattle member is in a closed position.

The hitch assembly further comprises a anti-rattle member in the form of an end cap 30, which is pivotally secured with respect to the receiver tube 21 via a pair of pivot arms 34 (as best shown in FIGS. 6 and 11) which are configured to engage with corresponding pivot apertures 26 located in the receiver tube 21 such that the end cap is moveable between a closed position (as shown in FIGS. 5 and 16B) where it covers the opening 23 of the receiver tube 21, and an open position (as shown in FIGS. 4 and 16A) where it allows for the hitch member 40 to be inserted through the opening 23 of the receiver tube 21. The end cap is able to be latched in the closed position by virtue of a pair of part-spherical projections 35 (as best shown in FIGS. 6, 11, 16A and 16B) formed in the body 31 of the end cap which are configured to releasably engage with a pair of latching apertures 27 formed in the receiver tube 21.

It will be appreciated that alternative means for both pivotally securing the end cap 30 with respect to the receiver tube 21 and latching the end cap 30 to the receiver tube 21 will be possible.

Figure 9:
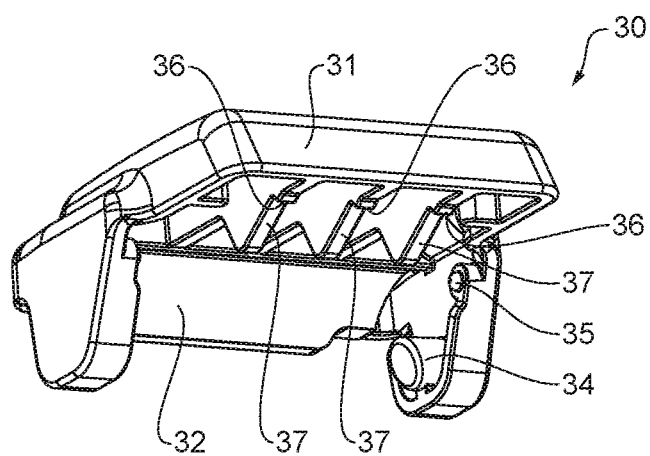
FIG. 9 is a perspective view of an anti-rattle member according to an embodiment.
Figure 10:
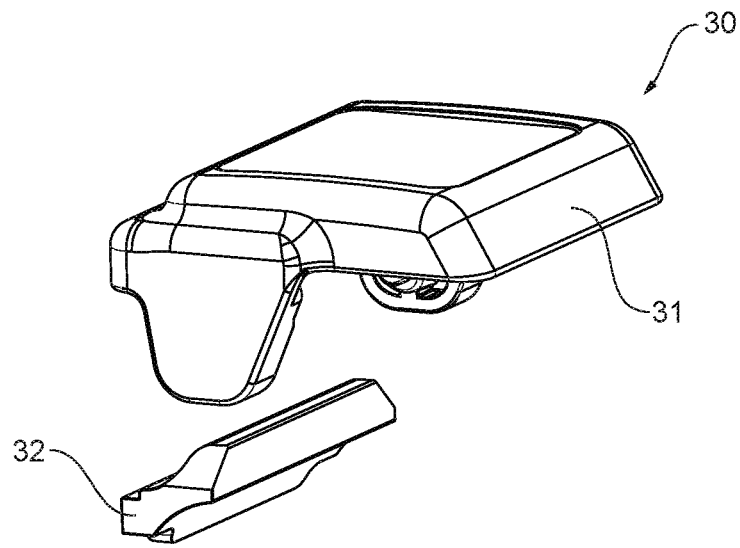
FIG. 10 is an exploded view of the anti-rattle member of FIG. 9.

As shown in FIGS. 9 to 11, the end cap 30 comprises a rigid body 31 and a resilient portion 32 located within a recess 33 in the body 31. In one form the resilient portion 32 may be in the form of an insert 32 which is secured to the body 31, in another form, the resilient portion may be co-molded to form a unitary component.

The rigid body 31 may be made from a rigid material such as glass filled nylon or ABS, and the resilient portion 32 may be made from a resilient material such as polyurethane or rubber. It will be appreciated that suitable alternative materials may also be employed. For example, an alternative embodiment may instead employ a spring, instead of a resilient portion, and in a further alternative embodiment the end cap may be made entirely from a resilient material such as polyurethane, rubber or spring steel, the end result being that all embodiments produce a reaction force from the resilient deformation.

When the end cap 30 is in the open position, such as is shown in FIG. 16A (and 17A), the resilient portion 32 of the end cap 30 rests against an outer surface 28 on the receiver tube 21, such that any further rotation of the end cap 30 beyond the open position will cause the resilient portion 32 to resiliently deform as it is pressed/forced against the outer surface 28.

Figure 12:
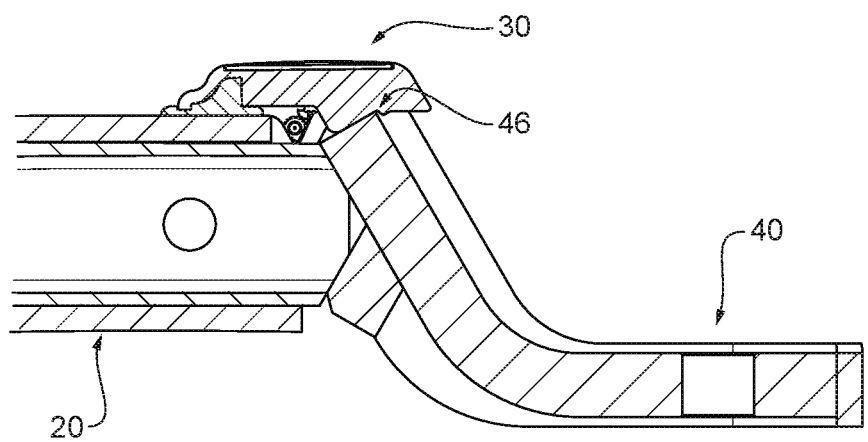
FIG. 12 is a cross sectional view of the hitch assembly of FIG. 1.
Figure 13:
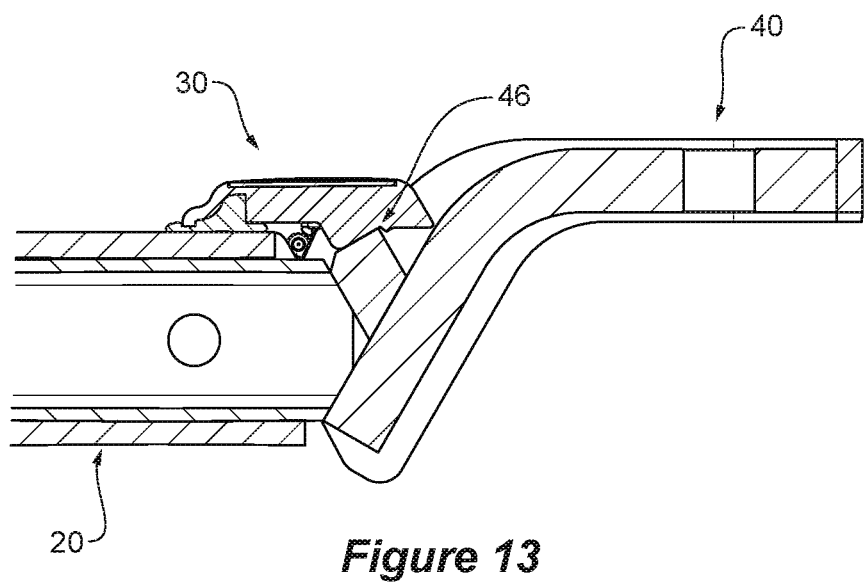
FIG. 13 is a cross sectional view of the hitch assembly of FIG. 3, with the hitch member inverted.

As shown in FIGS. 12 and 13, the end cap 30 and hitch member 40 are configured such that when the hitch body 41 is received by the receiver 20, the hitch member 40 bears against the end cap 30 causing the end cap 30 to resiliently deform the resilient portion in a manner that a reaction force from the resilient deformation causes the hitch 41 body to bear against the receiver 20.

Engagement between the end cap 30 and the hitch member 40 is by way a hitch following means in the form of at least one projection 36 and a hitch stopping means in the form of at least one stop surface 37 provided on the end cap 30, and an end cap engagement portion 46 on the hitch member 40 as is shown most clearly in FIG. 15. The engagement portion 46 comprises a first ramped surface 47 and a second ramped surface 48 that intersect at a tip 49.

As can be seen in FIG. 9, the end cap features three ribbed features each comprising a projection 36 and a stop surface 37. It will be appreciated that ribbed features are often used to provide strength to a part while reducing the amount of material required, and that in alternative embodiments, the end cap may feature any number of projections 36 and stop surfaces 37, with at least one of each required to engage with the hitch member.

Figure 14:
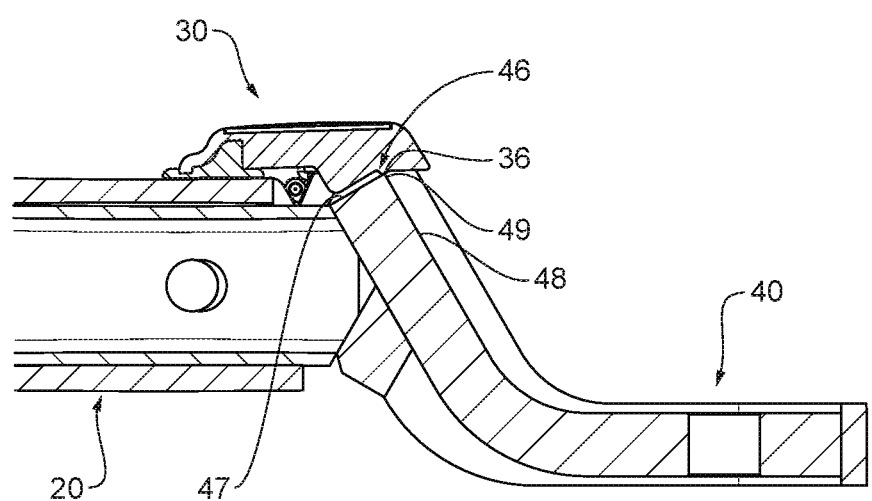
FIG. 14 is a cross sectional view of the hitch assembly of FIG. 1, detailing the relationship between the hitch member and the anti-rattle member as the hitch member is inserted in to the opening in the receiver and the first ramped surfaces engages with the hitch following projection.
Figure 15:
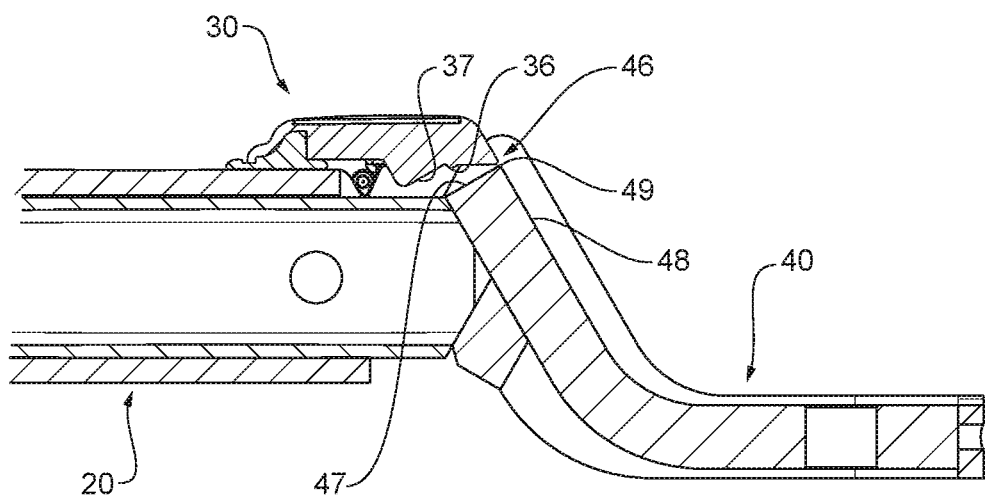
FIG. 15 is a cross sectional view of the hitch assembly of FIG. 1, detailing the relationship between the hitch member and the anti-rattle member prior to the first ramped surface engaging with the hitch following projection.

As shown in FIGS. 14 and 15, as the hitch member 40 is inserted in to the opening in the receiver 20, the first ramped surface 47 of the engagement portion 46 comes in to contact with and pushes against the projection 36 on the end cap 30, causing the projection 36 to ride up the first ramped surface 47 and in turn causes end cap 30 to pivot and the resilient portion 32 of the end cap 30 to resiliently deform against the outer surface 28 of the receiver tube 21. As shown in FIG. 12, as the hitch member 40 is pushed further through the opening 23 in the receiver 20, the hitch following projection 36 passes over the tip 49 and then follows the second ramped surface 48, allowing the resilient portion 32 to rebound. The hitch member 40 reaches its received position when the first ramped surface 47 of the engagement portion 46 bears against the stop surface 37 on the end cap 30, and the hitch pin apertures 41, 25 in the hitch member 40 and receiver align 20.

As will be appreciated, the passing of the hitch following projection 36 over the tip 49 of the engagement portion 46 has the effect of providing physical (and potentially audible) feedback to a user that the hitch member 40 has reached the received position. As will also be appreciated, while the hitch member 40 remains in the received position, the resilient portion 32 of the end cap 30 remains resiliently deformed against the outer surface 28 of the receiver 20 such that the reaction force from the resilient deformation causes the stop surface 37 of the end cap 30 to push against the first surface 47 of the hitch member 40 causing the hitch body 41 to bear against the receiver 20.

It will be appreciated that movement of the hitch member 40 within the receiver 20 will be resisted by the resilience of the end cap 30, which has the effect of reducing vibration occurring between the hitch member 40 and the receiver 20. It will further be appreciated that the end cap is also capable of absorbing shock forces caused by heavy impacts on the hitch. This not only reduces the wear on parts but reduces the amount of noise heard by the driver.

It will be appreciated that different angles of ramped surfaces 47,48 may be employed, where a greater angle of first ramped surface 47 will result in a larger movement of the end cap 30, and a greater reaction force from the resultant resilient deformation, while a reduced angle will result in a smaller movement of the end cap 30, and a smaller reaction force from the resultant resilient deformation.

In the embodiment shown, the angle that the first ramped surface 47 makes with the hitch body 41 is 150 degrees, and the second ramped surface 48 is perpendicular to the first ramped surface 41. It will be appreciated that a range of angles would achieve the desired result, however if the angle is too small, the force required to deform the cap will become prohibitive, and if the angle is too large, the feedback to the user will become indiscernible.

As can be seen in FIGS. 7,8 and 13 the hitch member 40 also features a second engagement portion 50 which performs the same function as described with respect to the first engagement portion 46 when the hitch member 40 is inverted and inserted in the receiver 20.

Figure 17A:
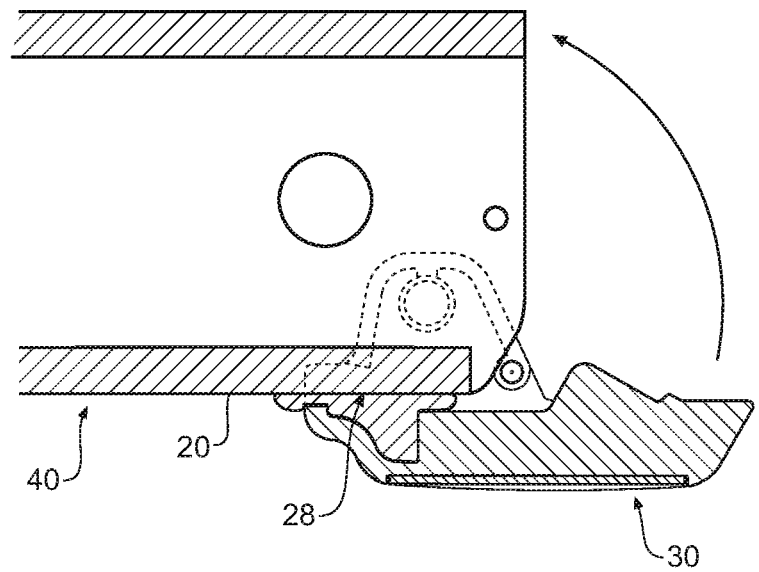
FIG. 17A is a cross sectional view of a hitch assembly according to an embodiment, detailing an alternative pivoting arrangement for the anti-rattle member, where the anti-rattle member is in the open position.
Figure 17B:
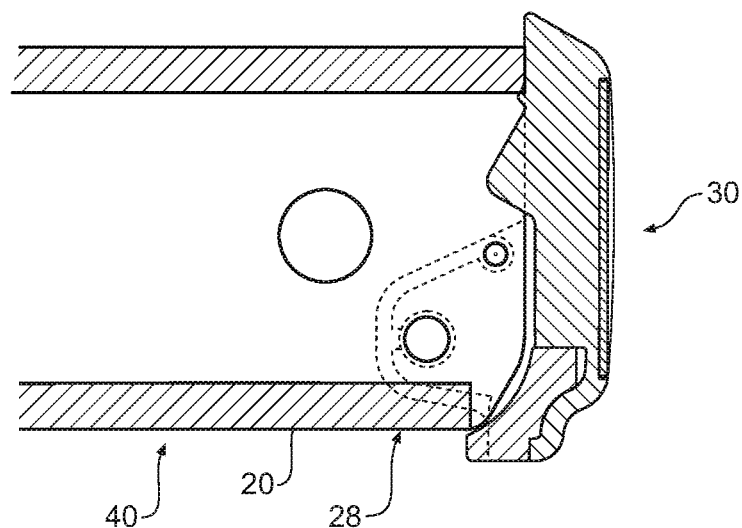
FIG. 17B is a cross sectional view of a hitch assembly according to an embodiment, detailing an alternative pivoting arrangement for the anti-rattle member, where the anti-rattle member is in the closed position

FIGS. 17A and 17B are cross sectional views of a hitch assembly according to an alternative embodiment, where the end cap 30 is instead pivotally mounted to the receiver 20 such that it pivots open in a downward direction, while still being capable of engaging with the hitch member 40. It will therefore be appreciated that the hitch assembly is not limited by the position or direction of movement of the end cap.

Figure 18:
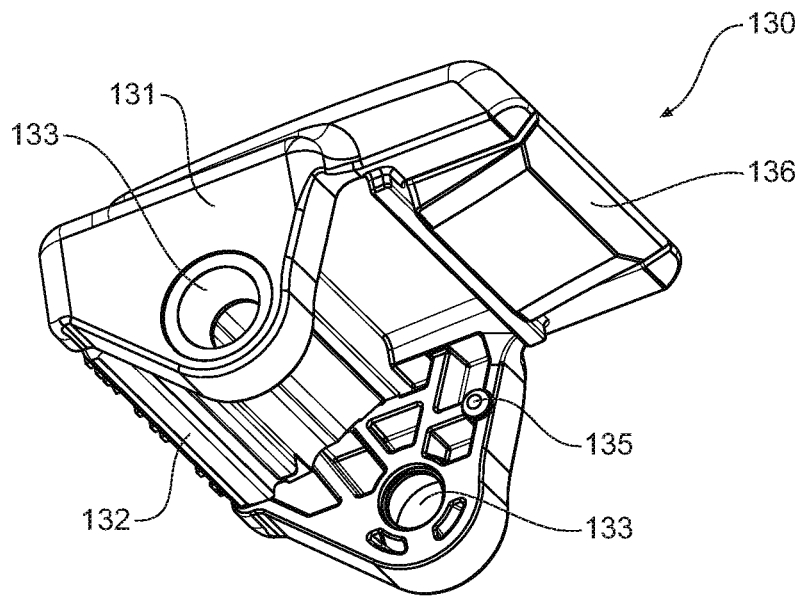
FIG. 18 is a perspective view of an anti-rattle member according to an alternate embodiment.
Figure 19:
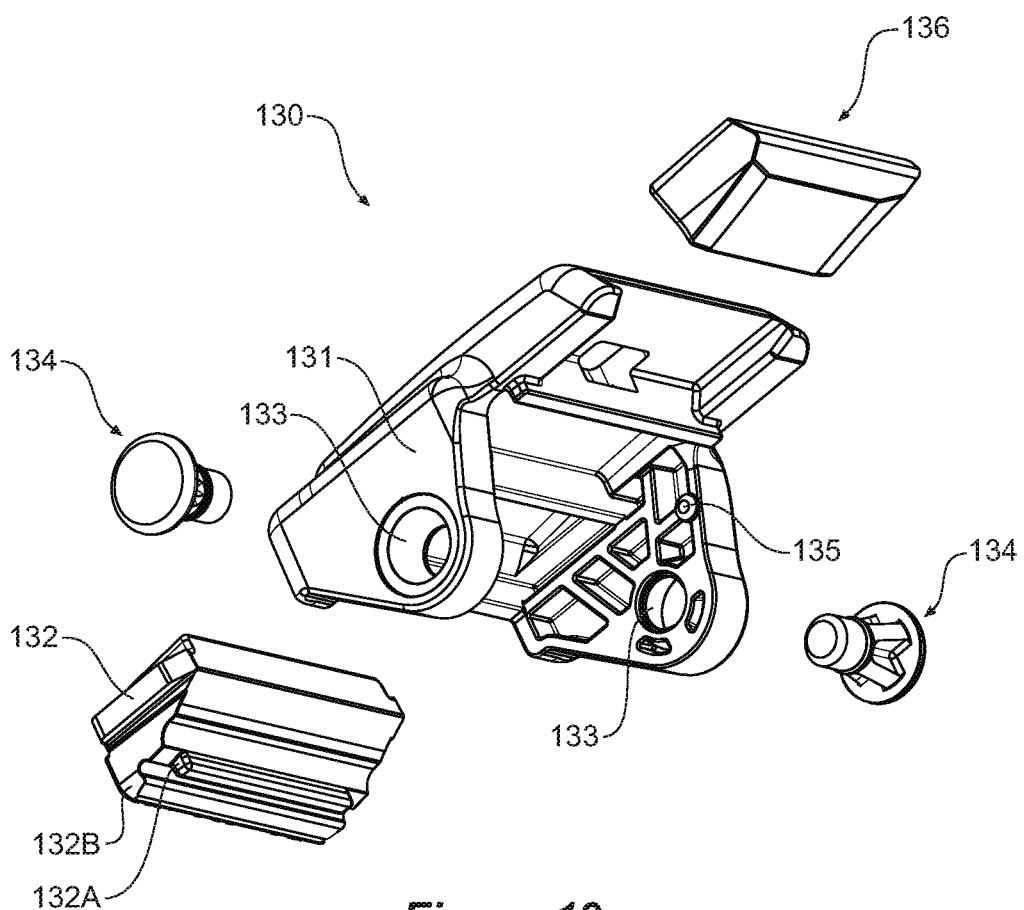
FIG. 19 is an exploded view of the anti-rattle member of FIG. 18.
Figure 20:
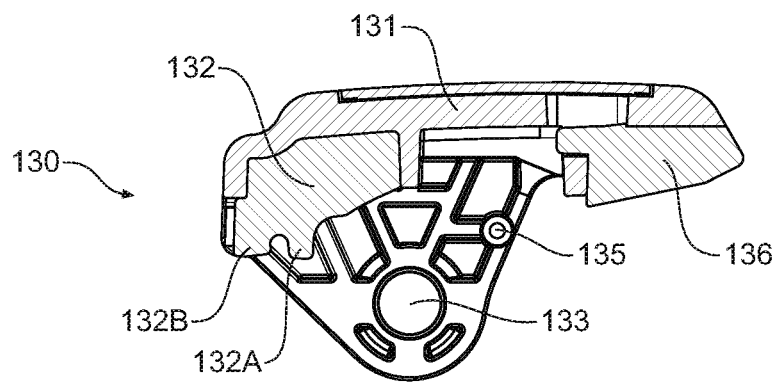
FIG. 20 is a cross sectional view of the anti-rattle member of FIG. 18.

Referring now to FIGS. 18 to 20, where there is shown an end cap 130 according to an alternate embodiment. The end cap 130 comprises a rigid body 131, a resilient portion 132 and a hitch following portion 136. In one form the resilient portion 132 and the hitch following portion may be in the form of inserts which are secured to the body, in another form, one or both of the portions may be co-molded with the rigid body to form a unitary component.

The rigid body 131 may be made from a rigid material such as glass filed nylon or ABS, the resilient portion 132 may be made from a resilient material such as polyurethane or rubber, and the hitch following portion 136 may be made from a rigid, low-friction material such as ultra-high-molecular-weight polyethylene. It will be appreciated that suitable alternative materials may also be employed.

The end cap 130 works generally in the same fashion as the end cap 30 described above, with the deformation of the resilient portion creating a reaction force that causes the hitch body to bear against the receiver. Where the end cap 130 differs is in the form of the resilient portion and the manner in which it deforms, the manner in which the end cap engages the hitch member, and the manner in which the end cap is secured to the receiver.

Figure 21:
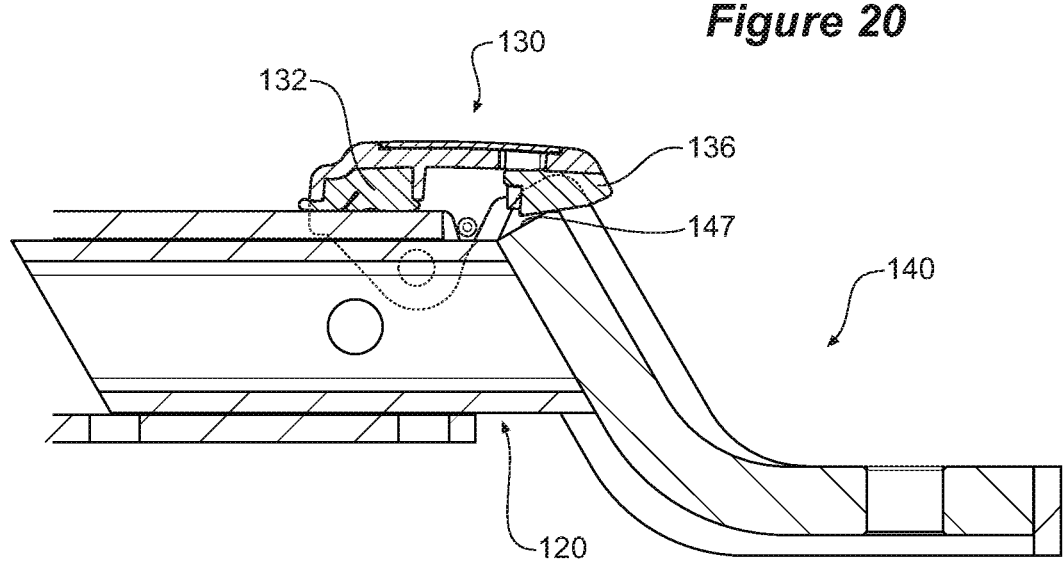
FIG. 21 is a cross-sectional view of a hitch assembly according to an alternate embodiment, using the anti-rattle member of FIG. 18, with the hitch member fully inserted in to the receiver.
Figure 22:
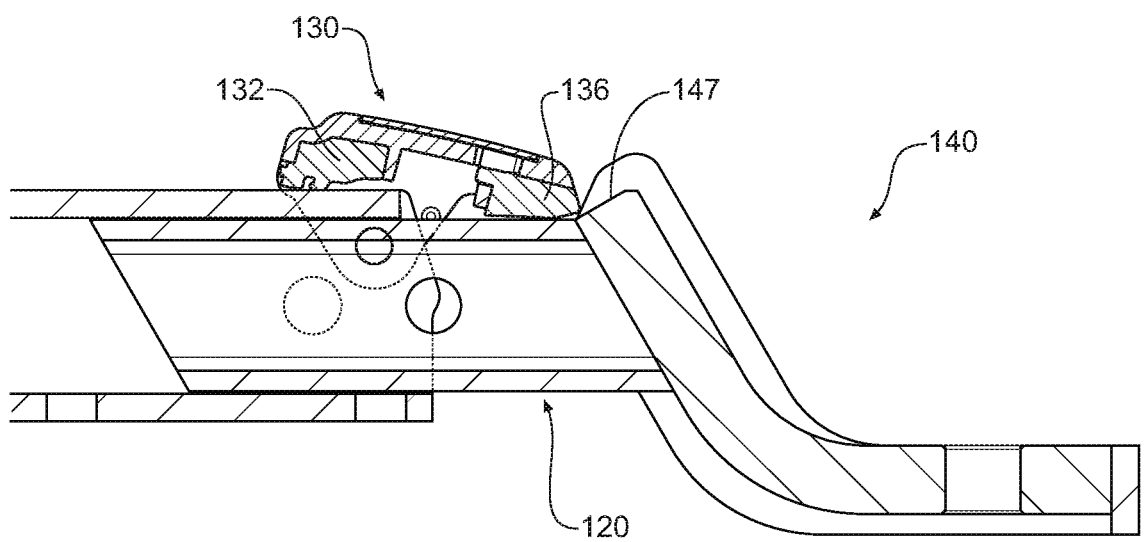
FIG. 22 is a cross-sectional view of the hitch assembly of FIG. 21, detailing the relationship between the hitch member and the anti-rattle member prior to the first ramped surface engaging with the hitch following portion.

The resilient portion 132 comprises first and second projections 132A, 132B, configured to bear against the top surface of the receiver. The first projection 132A having a smaller cross-sectional area than the second projection 132B, with the first projection 132A offering a lower reaction force to compressive forces than the second projection 132B. As shown in FIGS. 21 and 22, as the hitch member 140 is inserted in to the receiver 120, the first projection 132A is first to come in to contact with the receiver 120 and begins to resiliently deform first, providing a user with a small amount of resistance to insertion. As the hitch member reaches its fully inserted position within the receiver (as shown in FIG. 21) the second projection 132B also bears against the receiver, providing a user with a large amount of resistance to insertion, indicating that the hitch member is fully inserted.

Engagement between the end cap 130 and the hitch member 140 is by way of a hitch following portion 136, and a ramped end cap engaging surface 147 on the hitch member. As shown in FIGS. 21 and 22, as the hitch member 140 is inserted in to the opening in the receiver 120, the engaging surface 147 and the hitch following portion 136 come in to contact with each other, causing the hitch following portion 136 to ride up the engaging surface 147, and in turn cause the end cap 130 to pivot and the resilient portion 132 of the end cap 130 to resilient deform against the receiver 120.

The end cap 130 is pivotally secured with respect to the receiver by a pair of clip-in pivot pins 134 which are inserted through apertures 133 in the body 131 and in to corresponding pivot apertures 26 located in the receiver tube such that the end cap 130 is moveable between a closed position and an open position.

While in the embodiments shown, the end caps 30, 130 pivot about the receiver, and resistance to this pivoting movement beyond the open position is caused by the resilient deformation of a portion of each of the end caps 30, 130, it will be appreciated that in an alternative embodiment, the hitch assembly may instead comprise an anti-rattle member rigidly secured with respect to the receiver, where resistance to movement occurs through the resilient deformation of all or a portion of the anti-rattle member.

It will be appreciated that the "anti-rattle member" will generally be configured to reduce or eliminate vibration and or rattle. The term "anti-rattle member" should be read broadly to encompass devices or assemblies that reduce vibration or rattling, but not necessarily both.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A hitch assembly comprising:
    a receiver having an opening for receiving a hitch member;
    an anti-rattle member secured with respect to the receiver; and
    a hitch member comprising:
    a hitch body configured to be received by the receiver; and
    an engagement portion;
    wherein when the hitch body is received by the receiver, the engagement portion bears against the anti-rattle member causing at least a portion of the anti-rattle member to resiliently deform in a manner that a reaction force from the resilient deformation causes the hitch body to bear against the receiver,
    wherein the anti-rattle member is pivotally secured to the receiver and is moveable between a closed position, where the anti-rattle member covers the opening of the receiver, and an open position, where the anti-rattle member does not obstruct the opening of the receiver.

2. The hitch assembly as claimed in claim 1, wherein the engagement portion is in the form of a ramped surface disposed at an angle with respect to the hitch body.

3. The hitch assembly as claimed in claim 2, wherein the anti-rattle member further comprises a hitch following portion configured to follow the ramped surface as the hitch is inserted into the receiver.

4. The hitch assembly as claimed in claim 1, wherein the engagement portion has a first ramped surface disposed at a first angle with respect to the hitch body, and a second ramped surface disposed at a second angle with respect to the hitch body, where the first and second ramped surfaces intersect at a tip.

5. The hitch assembly as claimed in claim 4, wherein the anti-rattle member further comprises a hitch following projection configured to follow the first and second ramped surfaces of the engagement portion as the hitch is inserted into the receiver.

6. The hitch assembly as claimed in claim 5, wherein the engagement portion is positioned with respect to the hitch body such that the hitch following projection just passes the tip as the hitch tube reaches a received position in the receiver.

7. The hitch assembly as claimed in claim 6, wherein movement of the hitch following projection past the tip provides physical feedback that the hitch member is in the received position.

8. The hitch assembly as claimed in claim 1, wherein the anti-rattle member comprises a rigid body and a resilient portion.

9. The hitch assembly as claimed in claim 8, wherein the resilient portion is an insert located within a recess in the rigid body.

10. The hitch assembly as claimed in claim 8, wherein the resilient portion and the rigid portion are co-molded to form a unitary component.

11. The hitch assembly as claimed in claim 8, wherein the resilient portion is made from a resilient material.

12. The hitch assembly as claimed in claim 1, wherein when the anti-rattle member is in the open position, at least a portion of the anti-rattle member bears against an outer surface of the receiver, such that any further rotation of the anti-rattle member beyond the open position will cause the resilient portion of the anti-rattle member to resiliently deform as it is forced against the outer surface.

13. The hitch assembly as claimed in claim 1, wherein the anti-rattle member is able to be latched in the closed position.

* * * * *

UNITED STATES PATENT AND TRADEMARK OFFICE
CERTIFICATE OF CORRECTION

| | | |
|---|---|---|
| PATENT NO. | : 11,084,341 B2 | Page 1 of 1 |
| APPLICATION NO. | : 16/277358 | |
| DATED | : August 10, 2021 | |
| INVENTOR(S) | : Greg Spooner et al. | |

It is certified that error appears in the above-identified patent and that said Letters Patent is hereby corrected as shown below:

On the Title Page

Item (30) Foreign Application Priority Data should read:
February 16, 2018 (AU) .......................... 2018900493

Signed and Sealed this
Eighth Day of August, 2023

*Katherine Kelly Vidal*

Katherine Kelly Vidal
*Director of the United States Patent and Trademark Office*